United States Patent [19]

Wehde

[11] 4,211,135

[45] Jul. 8, 1980

[54] CUTTING WIDTH MODIFYING MEANS FOR A LONGITUDINAL WEB CUTTING MACHINE

[75] Inventor: Friedrich Wehde, Bomlitz, Fed. Rep. of Germany

[73] Assignee: Firma Erwin Kampf GmbH & Co. Maschinenfabrik, Wiehl, Fed. Rep. of Germany

[21] Appl. No.: 943,469

[22] Filed: Sep. 18, 1978

[30] Foreign Application Priority Data

Sep. 17, 1977 [DE] Fed. Rep. of Germany ....... 2741908

[51] Int. Cl.[2] ............................................ B23D 19/04

[52] U.S. Cl. ........................................ 83/499; 83/504

[58] Field of Search ...................... 83/499, 425.4, 504

[56] References Cited

U.S. PATENT DOCUMENTS

| | | | |
|---|---|---|---|
| 325,812 | 9/1885 | Bridgman | 83/499 |
| 863,007 | 8/1907 | Sturteuant | 83/499 |
| 3,073,198 | 1/1963 | Clem | 83/504 |
| 3,422,714 | 1/1969 | Van Gompel | 83/504 X |

*Primary Examiner*—Harold D. Whitehead

*Attorney, Agent, or Firm*—Schwartz, Jeffery, Schwaab, Mack, Blumenthal & Koch

[57] ABSTRACT

Cutting width modifying means for a machine for cutting a web of material and having groups of cutting elements of the bottom blade kind for longitudinal cutting of the web wherein the cutting elements are provided as sleeves mounted on a shaft, releasably secured against rotation thereon by keys and axially adjustable by means of externally screw threaded rings mounted in screw threaded portions of the bores of the sleeves and non-rotatably secured on the shaft, retaining means being provided selectively to retain one or more of the sleeves against rotation so that it or they is or are axially adjusted on the shaft upon rotation of the shaft by a servo motor.

4 Claims, 5 Drawing Figures

POS. B

POS. A

CUTTING WIDTH MODIFYING MEANS FOR A LONGITUDINAL WEB CUTTING MACHINE

The invention relates to cutting width modifying means for a machine for cutting a web of material and having groups of cutting elements of the bottom blade kind, for longitudinal cutting of the web, the groups of cutting elements being arranged one beside the other on a cutting element group carrier.

Cutting width modifying means for machines for cutting a web of material have previously been proposed, in particular for cutting machines which are provided with so-called top blades and bottom blades. These blades are usually in the form of circular blades, and the webs of material are divided up by means of a shearing cut in such a way that a single wide web of material is fed to the machine and at least two correspondingly narrower webs of material leave the cutting machine after the cutting operation. In this cutting machine, the cutting operation is performed by means of a per se known co-operation of top and bottom blades.

In addition to other differences, the previously proposed web roll cutting machines may also be distinguished by reference to the different kinds of web guide action. In the first group of such cutting machines, the web of material to be cut is moved past the bottom blades either tangentially or at most extends around the bottom blades over only a few degrees of angle of the periphery thereof, whereby the web of material is cut.

In the second major group however the web of material to be cut is caused to extend around the cutting bottom blade, and the degree of looping of the web of material around the bottom blade may be up to 270°.

In previously proposed cutting machines of the first group, where the web extends substantially tangentially to the blade, when a change in the width at which the web is cut is desired, the adjustment of the bottom blades which is necessary is relatively easy. Indeed, the bottom blades are usually arranged on a bottom blade shaft which carries them without any intermediate members, that is to say, the spacings between the individual bottom blades are not filled with spacer members so that when adjustment is required the blades may be easily displaced, without there being any necessity for the blades and sleeves to be dismantled and re-installed again at fresh spacings.

In contrast to this, when a change in the width of cut is desired in a cutting machine of the second group, which operates on the principle of the web being looped around the blades, account must be taken of the fact that spacer members or sleeves are disposed between the individual bottom blades. These spacer members or sleeves are of the same diameter as the bottom blades, because the web of material which is to be cut and which is looped around the bottom blades must be protected from damage by being supported between the cutting positions. The webs in question may be in the form of very thin and thus easily deformable webs in the form of films and other sheet materials which are correspondingly easy to damage. Therefore, when a change in the width of cut is desired, in the bottom blade adjustment operation which is necessary for this purpose, it is necessary to adjust not only the distances of the bottom blades from each other, but also the spacer sleeves between the bottom blades. As obviously the spacer sleeves cannot be expanded or contracted as desired, the different distances between the bottom blades must be precisely filled with different spacer sleeves from those previously used, that is to say, spacer sleeves which are of greater or narrower width, so that the very thin webs of material which are to be cut by passing around the bottom blades can be handled without suffering damage. In practice therefore, whenever the cutting width is to be adjusted, all the bottom blades and all the spacer sleeves must be removed from the bottom blade shaft which carries them and must then be refitted at the fresh distances apart or with new spacer sleeves of the fresh width required.

For the purposes of reducing the considerable conversion times required in changing the apparatus in this manner, devices have already been developed, in which, instead of the bottom blades with spacer sleeves, grooved sleeves are used, or in which the bottom blade shaft is provided only with bottom blades or bottom blade discs and grooved discs. In this case, when a change in cutting width is to be effected, it is not necessary for the bottom blade shaft to be provided each time with fresh spacer sleeves, but instead each top blade is fitted into that one of the grooves which is at the desired or approximately desired spacing. With this arrangement of bottom blades, the minimum spacing of the grooves which is technically possible is from 3 to 5 mm. As however variations in regard to the widths of the webs cut of ±0.5 mm may be required, in the case of printed webs of material even closer smaller variations of less than 0.5 mm may be required, the above-mentioned improvement can only be used in a few cases in prior art machines.

Improvement as regards the adjustment means has been proposed involving so-called 'razor-blade cutting apparatus', in the operation of 'mirror-reflected cut' or 'open web motion'. However, for reasons which are well known to the man skilled in the art, such cutting apparatus cannot be used for cutting many types of film, quite apart from the fact that the quality of the cut does not correspond to the above-mentioned shearing cut using circular blades.

The present invention therefore has among its objects to solve the problems outlined above by providing cutting width modifying means for a machine for cutting a web of material and having groups of cutting elements of the bottom blade kind for longitudinal cutting of the web, wherein the groups of cutting elements are disposed one beside another on a cutting element group carrier, the cutting element group carrier and the cutting element groups are provided with co-operating disengageable coupling means in the form of keys and screw threads which permit selective relative rotation of the cutting element group carrier with respect to individual ones of the cutting element groups to adjust the axial position of cutting elements of one of the groups with respect to cutting elements of another of the groups and thereby permit variation in the spacing of the longitudinal cuts in the web.

The above-mentioned disengageable coupling means thus provide easy and hitherto unexpectedly rapid adjustment of the positions of the cutting elements relative to each other, and also of the position of the cutting elements relative to the carriers of the cutting elements. It is advantageous for the cutting element group carrier to be formed as a shaft provided with at least one longitudinal groove and a further longitudinal groove. The groups of cutting elements preferably include bottom blade sleeves each having a bore in which the shaft is received and each having, in said bore, at least one longitudinal groove, a screw threaded portion with the screw threaded ring releasably but non-rotatably connected to the shaft by way of a projection on the ring engaged in said further longitudinal groove in the shaft, but at the same time the same screw threaded ring is releasably but axially non-displaceably connected to the shaft by spacer members and fitting members. A form fitting key is preferably disposed in said one longitudinal groove in the shaft, the fitting key having cams for releasable engagement in said at least one longitudinal groove in the bottom blade sleeves. The bottom blade sleeves are selectively securable against undesired rotary movement by retaining means.

The retaining means preferably comprise a shell member, with a friction lining engageable with the respective bottom blade sleeve and mounted to be axially movable at least to the same extent as the axial movement of the respective bottom blade sleeve during axial adjustment thereof.

A servo motor is preferably provided to rotate the bottom blade shaft through very small angles of rotary movement, of for example 3° and less, or if desired through very large angles of rotary movement, to effect axial adjustment of the bottom blade sleeves, said servo motor being independent of a drive motor which rotates the bottom blade shaft during normal operation of the machine.

The present invention can make it possible for the first time for the adjustment of cutting width on the bottom blade shaft to be effected reliably and indeed without the setting operators which were previously required, without the previous conversion times of up to 20 minutes, instead requiring conversion times of 30 seconds to about 2 minutes. In addition, the invention can make it possible for the first time for the operation of adjusting the cutting width on the bottom blade shaft, in machines in which the web of material is looped around the bottom blades, to be fully automated. In this way, in practice it is possible commercially to perform small orders for cutting web lengths of a weight of 100 to 500 kg, as the operations of cutting width adjustment which naturally become necessary at particularly frequent intervals on small orders, within a unit of time, can now be effected without high cost, in a manner which is economical both in respect of time and expense.

Instead of using bottom blade sleeves made in one piece with grooves machined therein, it is equally possible to use bottom blade sleeves which are composed in per se known manner by the usual main basic body member, blade discs and grooved discs, and associated screw means.

The relative rotary movement between the bottom blade shaft and the bottom blade sleeve can, if desired, be provided by driving the sleeve, instead of by driving the shaft. The number of longitudinal grooves in the bottom blade sleeves can be varied. If the form fitting key still provides for the required transmission of force, the form fitting key may be of a very small size, so that the number of longitudinal grooves per unit can be considerably increased. Conversely, it is possible for the number of longitudinal grooves to be reduced if desired, if the graduated spacing of the bottom blade sleeves relative to each other is not made fine but is to be 'coarsened'. It is also within the scope of the invention for the longitudinal grooves to be replaced by an internal longitudinal spline or tooth assembly in the bottom blade sleeve and on the fitting key when there is a requirement for minimum adjustment of the spacing between the bottom blade sleeves relative to each other of for example less than 0.1 mm.

The form fitting key may comprise a commercially available fitting key with additionally inserted pin members. The preferred drive for the bottom blade shaft is a servo motor but it could equally be manual. The cutting width modifying means may also be made movable, within the setting of a corresponding cutting machine, and in addition may be installed or attached, not only in conjunction with a so-called roller winding machine but also, according to requirements and wishes, equally well on other commercially available machines, for example a bag manufacturing machine, a transverse cutter, a machine for further processing of film material, a printing machine, a lining machine or a coating machine.

The invention is diagrammatically illustrated by way of example in the accompanying drawings, in which.

Figure 2:
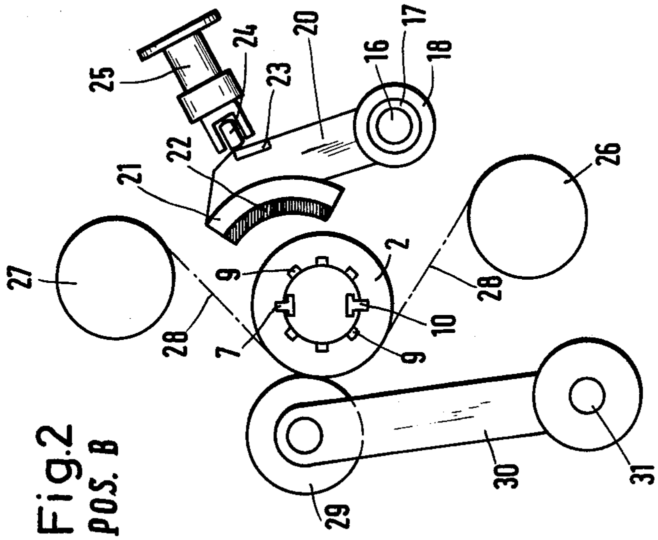
FIG. 2 shows a bottom blade and a device for adjustment, position A showing adjustment of the device and position B showing the operation of cutting of a film between two adjustment operations of the means of FIG. 1.
Figure 2:
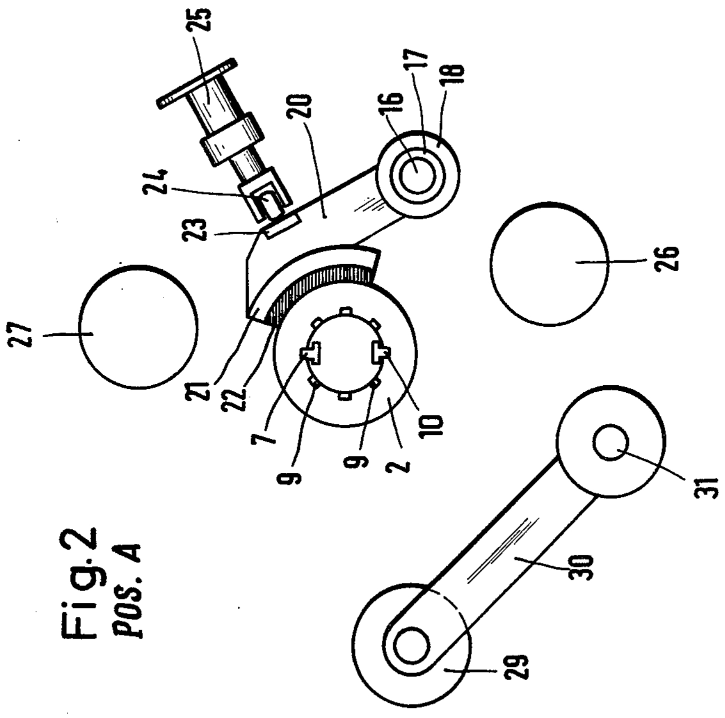
Figure 3:
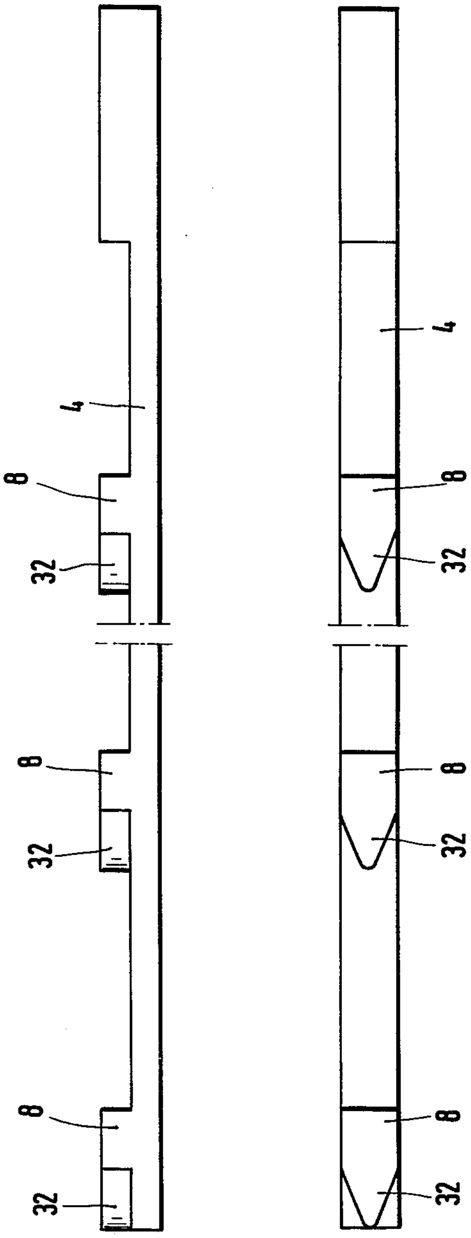
FIG. 3 shows a form fitting key with its individual elements of the means of FIGS. 1 and 2.

Referring to the drawings, a cutting device in a winding and cutting machine includes a bottom blade shaft 1. As can be seen, particularly in FIGS. 1, 2A, 2B and 4, bottom blade sleeves 2*a* to 2*g* are disposed on the bottom blade shaft 1, the bottom blade sleeves 2 being at a variable spacing from or relative to each other. The bottom blade sleeves 2 have two possible degrees of freedom on the shaft 1, the first degree of freedom being rotation about the longitudinal axis of the shaft and the second degree of freedom being axial movement in the direction of the longitudinal axis of the shaft. These degrees of freedom are nullifiable by three elements 3, 4 and 5 which are mounted on the shaft 1 and which are all positively connected to the shaft 1. In the illustrated embodiment the positive connection of the bottom blade sleeves 2*a* to 2*g* to the bottom blade shaft 1 is provided firstly by the engagement of a form fitting key 4 into a longitudinal groove 10 in the bottom blade shaft 1 and the engagement of the form fitting key 4 in a longitudinal groove 9 in the bottom blade sleeves 2*a* to 2*g*, and secondly by the engagement of a screw threaded ring 3 by means of an external screw thread 12 thereon into an internal screw thread 11 in each bottom blade sleeve 2*a* to 2*g* and the engagement of a projection 6 of the screw threaded ring 3 into a longitudinal T-groove 7 in the bottom blade shaft 1 (FIGS. 1, 2 and 3).

The positive connection of the screw threaded ring 3 with respect to the bottom blade shaft 1 in the axial direction is achieved by the projections 6 of the screw threaded rings 3, which engage into the longitudinal T-groove 7, and fitting members 5 which are disposed between the projections 6 on the screw threaded rings. Each of the first one and the last one of the fitting members 5 is connected to the bottom blade shaft 1 by for example a screw connection (not shown in the drawing) in the longitudinal T-groove 7.

All the screw threaded rings 3 are positively connected to the bottom blade shaft 1 (FIG. 1) by the arrangement of each screw threaded ring 3 with its respective projection 6 in the longitudinal groove 7 in the bottom blade shaft 1, and the fitting members 5 which are disposed in the longitudinal groove 7 between the individual screw threaded rings 3. The form fitting key 4 which is disposed in the longitudinal groove 10 in the bottom blade shaft 1 is mounted for axial displacement in the groove 7, so that, depending on its position, it is either in engagement by means of a cam 8 thereof with the bottom blade sleeve 2 in the longitudinal grooves 9 thereof, or alternatively is not in engagement with the bottom blade sleeve 2, so that in the last-mentioned case the cam 8 is then disposed in an annular recess 13 in the bottom blade sleeve 2 (FIGS. 1, 2A and 2B). Moreover, to improve its function, the cam 8 is formed with a cam front taper portion 32, to which more detailed reference will be made hereinafter. Radial web portions 15 which serve as bottom blades are formed by machining radial grooves 14 in the bottom blade sleeves 2.

Figure 1:
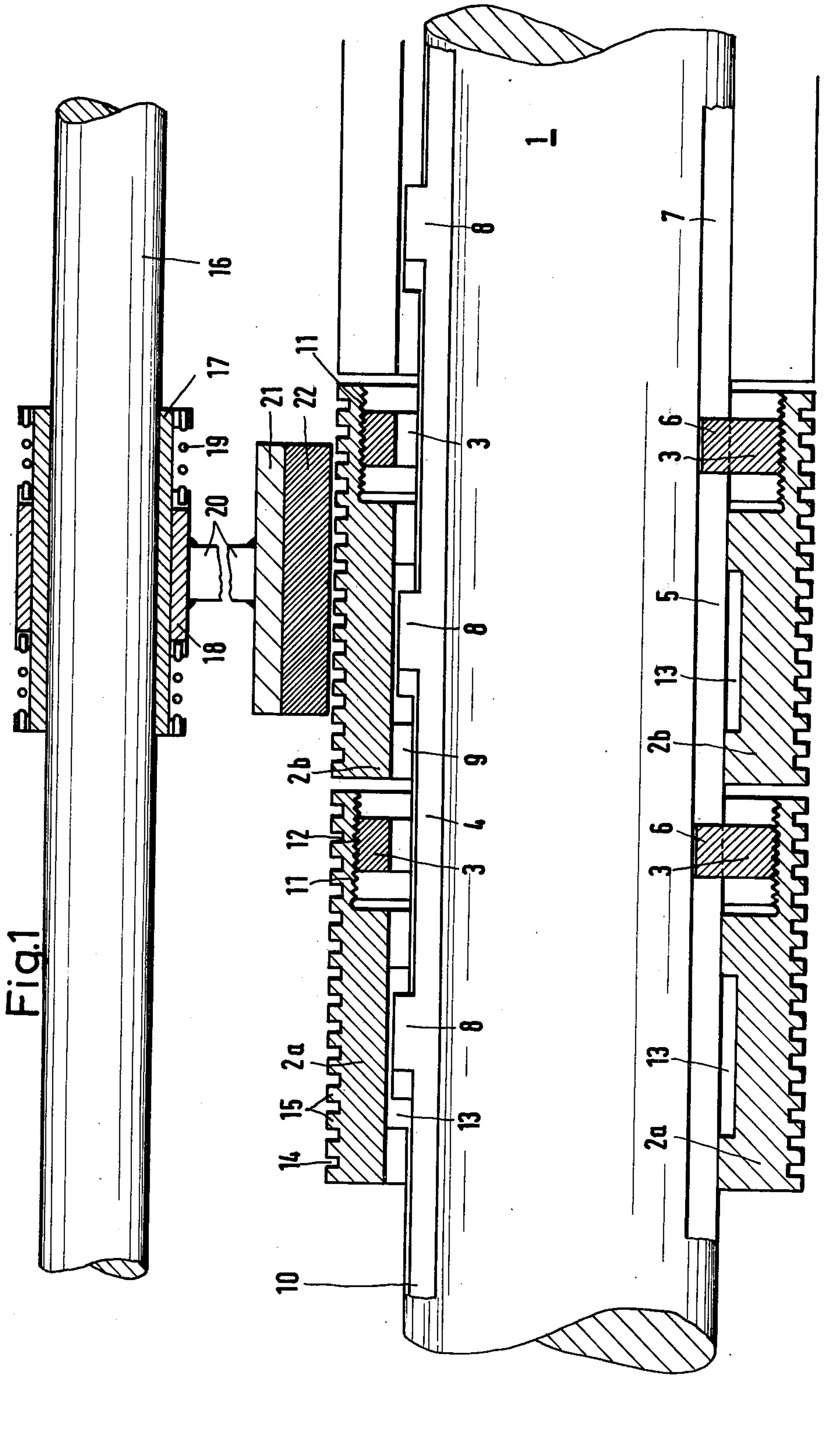
FIG. 1 shows a sectional view of a bottom blade shaft and sleeves with adjusting means and arresting means of cutting width modifying means according to the invention.

As can also be seen from FIGS. 1, 2A and 2B, for the purposes of providing relative rotational movement between the bottom blade sleeves 2*a* to 2*g* and the bottom blade shaft 1, retaining means are disposed around a shaft 16; said retaining means comprising, for each sleeve, a displacement sleeve 17, a hub 18 which is disposed thereon and which is mounted so as to be axially resilient and displaceable in traction and compression coil springs 19, a lever arm 20 on the hub 18, a lever arm surface 23 on the lever arm 20, a shell member 21 with a friction lining 22 mounted thereon, a respective one of cylinders 25*a* to 25*g* arranged beside the lever arm 20, and a respective one of pressure rollers 24*a* to 24*g* which are in turn disposed on said cylinders.

Disposed above and below the bottom blade sleeves 2*a* to 2*g* are guide rollers 26 and 27 which come into contact with the web of material 28 for the purposes of guiding the web of material (FIG. 2B).

Top blades 29 are arranged for pivotal movement, by means of a lever arm 30, about a pivot axis indicated at 31. As can be more clearly seen from FIG. 4, the bottom blade shaft 1 is mounted so as to be axially and radially fixed by means of a cone member 40 thereof received in a mounting cone member 41, while it is held by means of a shaft cone member 30 in a mounting cone member 36 which is axially adjustable by means of axial adjustment means 37. Cone member shafts 49 and 50 are mounted rotatably in respective roller bearings 38 and 42 which in turn are carried in machine frame members 47 and 48. A disc 33 which is axially displaceably mounted on the bottom blade shaft 1 is positively connected to the form fitting key 4. The disc 33 is in turn engaged by a forked lever 34 which is mounted pivotally on a pivot axis member 35. Disposed on the cone member shaft 50 is a belt pulley 43 which can be coupled and uncoupled by way of a magnetic clutch 44, while a further magnetic clutch 45 which is connected to a servo motor 46 is disposed on the same shaft 50 beside the belt pulley 43.

In operation, once the machine provided with the web cutting means has been set in operation, the machine guides the web of material 28 originating from a winding-off station (not shown) by the guide roller 26 over the bottom blade shaft 1 which is provided with the bottom blade sleeves 2*a* to 2*g*, to the guide roller 27. In doing this, the web of material 28 is drawn in the direction of movement between the top blade 29 and the bottom blade sleeves 2*a* to 2*g*, but into a series of correspondingly narrower webs of material and subsequently wound up again in a winding station (not shown). If it is desired to produce a web width which does not correspond to a multiple of the pitch of the radial web portions 15, it is necessary to modify the spacing of the bottom blade sleeves 2*a* to 2*g* relative to one another, to correspond to the desired change in the cut widths of the web of material. If for example a change in the width of only 1.2 mm of the cut web of material is to be effected, the following adjustment operation is effected in the region of the bottom blade sleeves 2*a* and 2*b* shown in FIG. 4, carrying out the following adjustment steps.

Figure 4:
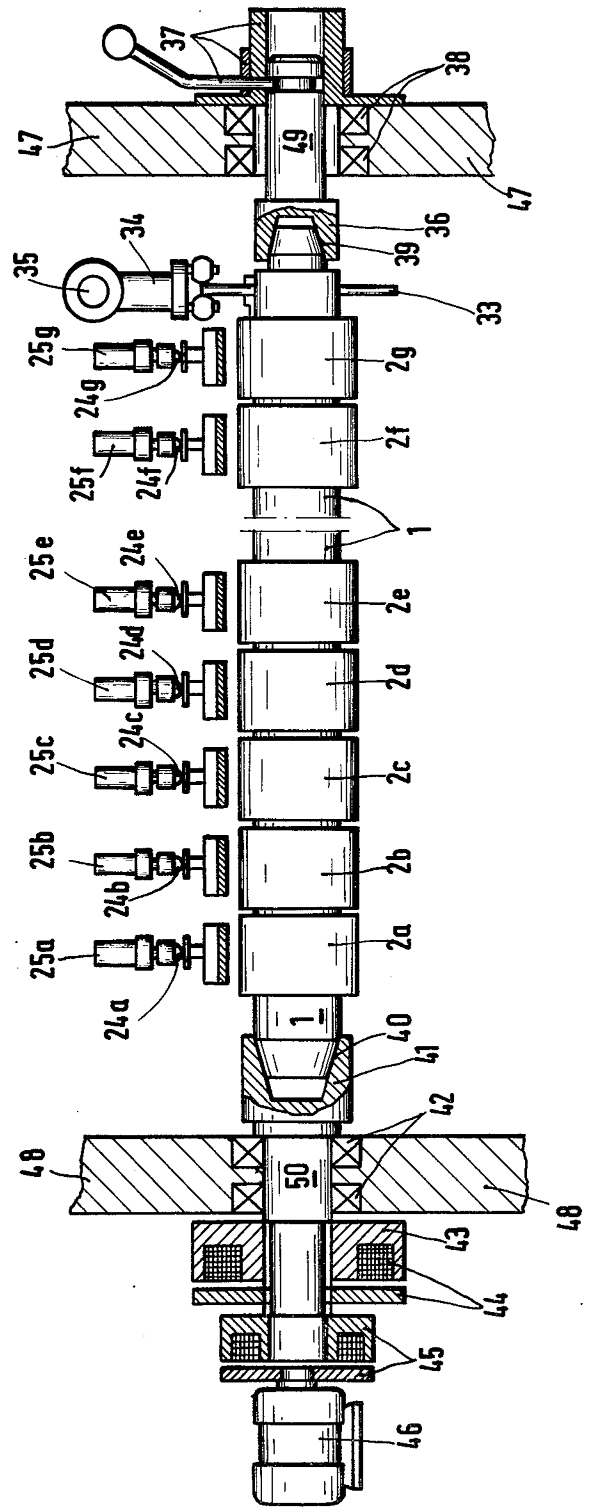
FIG. 4 shows a general view of the bottom blade shaft of the means of FIGS. 1 to 3 with a drive for automatic adjustment.

The drive belt pulley 43 of the bottom blade shaft 1 is uncoupled by the magnetic clutch 44. The magnetic clutch 45 drivingly connects the servo motor 46 to the bottom blade shaft 1 by way of the cone member shaft 50 (FIG. 4). Thereupon, the web of material 28 to be cut is removed from the region of the bottom blade sleeves 2*a* to 2*g* and the corresponding top blades 29 (FIG. 2A). The cylinder 25*b* which is operable in respect of the bottom blade sleeve 2*b* then presses the associated lever arm 20 towards the bottom blade shaft 1 by means of the associated pressure roller 24*b* shown in FIG. 4, by way of the associated lever arm surface 23 (FIGS. 2*a* and 2*b*). When this is done, the hub 18 rotates on the displacement sleeve 17 carried by the shaft 16. In this rotary movement, the coil compression and torsion spring 19 is stressed. The friction lining 22 which is secured to the shell member 21 is thereby pressed by the cylinder 25*b* onto the bottom blade sleeve 2*b* so that the bottom blade sleeve 2*b* is retained against rotary movement. The disc 33 which is engaged with the form fitting key 4 is so pivoted (by pivotal movement of the forked lever 34 which is engaged with the disc 33 and which pivots about the pivot axis member 35), in such a way that the fitting key 4 is displaced axially by such a distance that the cams 8 of the fitting key 4 engage into the associated annular recesses 13 in the bottom blade sleeves 2*a* to 2*g*.

For the sake of improved comprehension of the description of operation of the apparatus, reference is made at this point to the possible nullification of the two degrees of freedom; 'rotary movement' and 'axial movement', such nullification being possible by means of two components which are independent of each other in regard to their function, one of said components nullifying the possible rotary movement and the other said component nullifying the possible axial movement. Of these two degrees of freedom, which have just been briefly set out hereinbefore, once again the degree of freedom relating to rotary movement about the longitudinal axis is liberated by the sequence of operations just described hereinbefore. In the course of the rotary movement of the bottom blade shaft 1 by means of the servo motor 46, which is effected, all the bottom blade sleeves 2*a* to 2*g*, with the exception of the bottom blade sleeve 2*b*, rotate with the bottom blade shaft 1. The bottom blade sleeve 2*b* which does not rotate since it is retained by the associated friction lining 22 is axially adjusted in the desired manner, by way of its internal screw thread 11 and the and the external screw thread 12 on the associated screw threaded ring 3, according to the screw thread pitch and according to the number of revolutions of the bottom blade shaft 1. The relative rotary movement between the bottom blade shaft 1 and the bottom blade sleeve **2*b* which is being adjusted is terminated with one of the longitudinal grooves 9 in the bottom blade sleeve 2*b* over the form fitting key 4**.

As can be seen from FIGS. 2A and 2B, the bottom blade sleeves **2*a* to 2*g* contain a finite number of longitudinal grooves 9, there being eight longitudinal grooves 9 in the illustrated embodiment. The pitch of the internal screw thread 11 of the bottom blade sleeves 2*a* to 2*g* and of the external screw thread 12 of the associated screw threaded rings 3** is 1.6 mm, in the embodiment given by way of example. The following example of calculations is now given, in conjunction with the foregoing description, in order further to disclose the concept of the invention, the calculation being as follows, based on the above-mentioned change in the spacing of the bottom blade sleeves of 1.2 mm:

The screw thread pitch of 1.6 mm is multiplied by the number of revolutions, namely 0.75, of the bottom blade shaft 1, giving a change in the spacing between the bottom blade sleeves **2*a* and 2*b*, of 1.2 mm. Any axial adjustment of the bottom blade sleeve 2*b*, calculated in this manner, can thus be effected. Thereafter the form fitting key 4 is axially displaced, with the disc 33, by means of the forked lever 34, until the cams 8 of the form fitting key 4 are re-engaged in one of the longitudinal grooves 9 in the bottom blade sleeves 2. Any angular misalignment which may occur between the longitudinal grooves 9 in the bottom blade sleeves 2*a* to 2*g* and the form fitting key 4 is compensated by the cam front taper portions 32 of the cams 8, by means of the centering action which will be understood by and readily apparent to the man skilled in the art from FIG. 3**.

The axial displacement of the bottom blade sleeve **2*b* is transmitted to the associated friction lining 22 and the shell member 21 and thus to the lever arm 20, the hub 18 being axially displaced over the same distance on the displacement sleeve 17. When the lever arm 20 is pivoted away, the hub 18 is returned to its central and outward position by the coil compression and torsion springs 19**.

This therefore terminates the width adjustment of the cutting apparatus, by a distance of 1.2 mm, by means of the adjusting device so that the web of material 28 to be cut can now be drawn into the apparatus and subsequently cut.

Thus, stated briefly, the foregoing disclosure of the concept of the invention provides the possibility of rapid adjustment, with the axis-parallel displacement of the bottom blade sleeve considered as a resultant of the screw thread pitch and the extent of relative rotation of the sleeve with respect to the screw threaded ring.

Worn or damaged bottom blade sleeves 2 can be replaced as follows:

The forked lever 34 is taken out of engagement with the disc 33. The axially displaceable mounting cone member 36 is taken out of engagement with the shaft cone member 39 by the axial adjusting means with lever, sleeve and guide 37, and retracted by such a distance that the shaft cone member 40 can be extracted from the mounting cone member 41 and the bottom blade shaft 1, with the components 2 to 15 disposed thereon or thereat, can be removed from the machine. Means (not shown in the drawings) for securing the two outer fitting members 5 are released, and all the bottom blade sleeves 2, together with the screw threaded rings 3 and the fitting members 5, are drawn from the bottom blade shaft 1. Now, a respective fitting member 5 and a fresh bottom blade sleeve 2 with screw threaded ring 3 screwed therein are pushed on to the shaft in such a way that the projection 6 of the screw threaded ring engages into the longitudinal T-groove 7, and one of the longitudinal grooves 9 in the bottom blade sleeve 2 engages over the key 4. When all the members 2, 3 and 5 have thus been fitted on to the bottom blade shaft 1, the bottom blade shaft 1 can be re-installed in the machine.

Damage to or wear of only one radial web portion 15 does not necessitate a change of the bottom blade sleeves 2. With the multiplicity of radial web portions 15 provided, all the top blades 29 which are in a position of engagement may be displaced by one web portion or even by a plurality of web portions. It is only wear of or damage to a large number of radial web portions 15 which necessitates in changing the bottom blade sleeves 2.

The adjusting device according to the invention can permit a substantial saving of time when changing the cutting width, and also when changing blades on the bottom blade shaft.

Moreover, the apparatus according to the invention can be installed not only on new machines, but may also be applied as a conversion to many of the commercially available corresponding types of machine.

In spite of the simplicity of the adjusting device, this may advantageously be used, without disadvantages, on almost all machines which are predominantly directed to cutting foils which are very thin and are not self-supporting. Moreover, the apparatus according to the invention can also facilitate work, because the prolonged physical work which was previously involved in the conventional corresponding adjustment operation, can be replaced, when using the apparatus according to the invention, by simple actuation of switching buttons, to trigger an automatic conversion operation which in most cases can be completed in 30 seconds to 1 minute. It will be appreciated that any modern further developments such as for example automatic computing systems may be advantageously used in this respect. I claim:

1. Apparatus for adjustably controlling the width of cut of a web of material, comprising
   - (a) a bottom blade shaft having at least one longitudinal groove formed in the surface thereof,
   - (b) a plurality of bottom blade sleeves positioned around said shaft, each sleeve containing an internally threaded part, an annular recess, and a plurality of arcuately spaced longitudinal grooves,
   - (c) an externally threaded ring threadedly connected to said internally threaded part of each of said sleeves, and means for releasably but non-rotatably mounting said ring on said shaft,
   - (d) a key retainer mounted for axial movement in said longitudinal groove in said shaft, said key retainer being formed with at least one cam surface adapted to engage one of said longitudinal grooves formed in one of said sleeves,
   - (e) retaining means for permitting relative rotation between said plurality of sleeves, said retaining means including means for frictionally pressing against the associated sleeve for preventing rotary movement thereof relative to said shaft prior to adjustment of the width of cut,
   - (f) drive means for driving said shaft while said retaining means is frictionally pressing against said associated sleeve whereby said associated sleeve is adjusted axially relative to said shaft by virtue of engagement of its internally threaded part with said threaded ring, and (g) control means operatively connected to said key retainer and axially displaceable on said shaft for axially moving said key retainer for retaining said associated sleeve in its adjusted position.

2. The apparatus of claim 1 wherein said key retainer is formed with a plurality of cam surfaces each of which is engageable with one of said longitudinal grooves or said annular recess of each sleeve.

3. The apparatus of claim 1 wherein said bottom blade shaft is formed with a further longitudinal groove, and further including fitting members disposed within said further groove and fixed relative to said shaft, each of said rings including a radially extending projection which extends into said further groove between said fitting members, thereby retaining said rings against axial movement relative to said shaft.

4. The apparatus of claims 1, 2, or 3, wherein said retaining means includes a shell member and a friction lining carried by said shell member and adapted to frictionally press against said associated sleeve, and means for mounting said shell and friction lining so that the same can be moved axially during axial adjustment of said associated sleeve.

* * * * *